(No Model.)

W. F. KEHM.
DRAFT EVENER.

No. 508,023. Patented Nov. 7, 1893.

Witnesses.
A. Ruppert.
G. B. Fowlis

Inventor.
Wm F. Kehm,
Per
Thomas R. Simpson,
Atty.

UNITED STATES PATENT OFFICE.

WILLIAM F. KEHM, OF PORTLAND, IOWA.

DRAFT-EVENER.

SPECIFICATION forming part of Letters Patent No. 508,023, dated November 7, 1893.

Application filed February 4, 1893. Serial No. 460,958. (No model.)

*To all whom it may concern:*

Be it known that I, WILLIAM F. KEHM, a citizen of the United States, residing at Portland, in the county of Cerro Gordo and State of Iowa, have invented certain new and useful Improvements in Draft-Eveners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to make an equalizer which may be quickly and readily adapted to the use of three or four horses—as hereinafter described.

Figure 1:
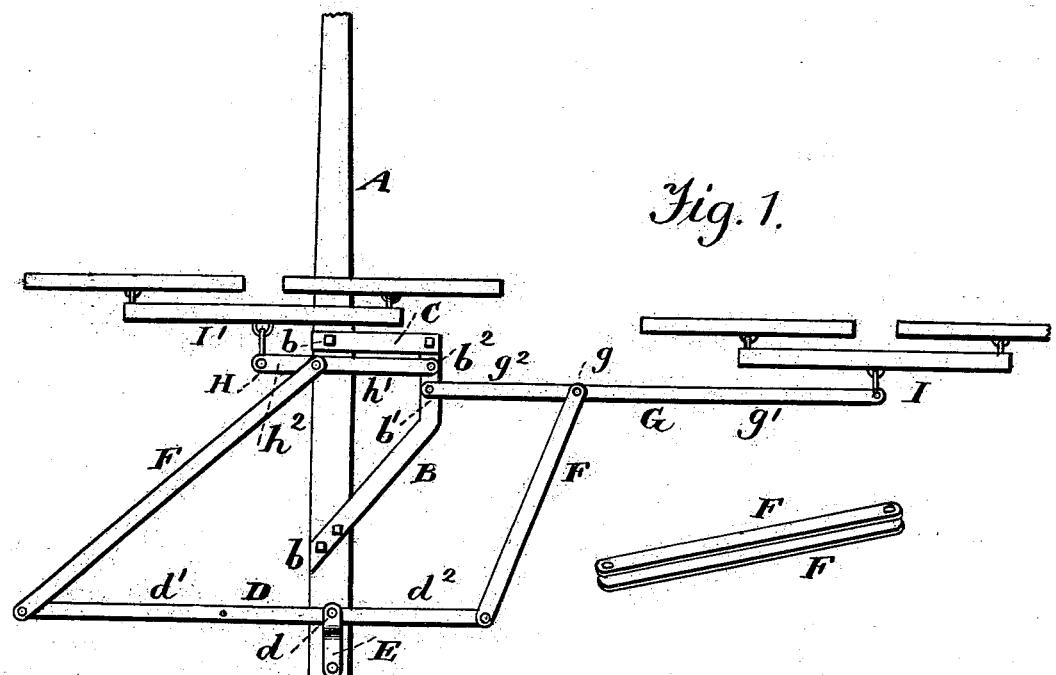
Figure 2:
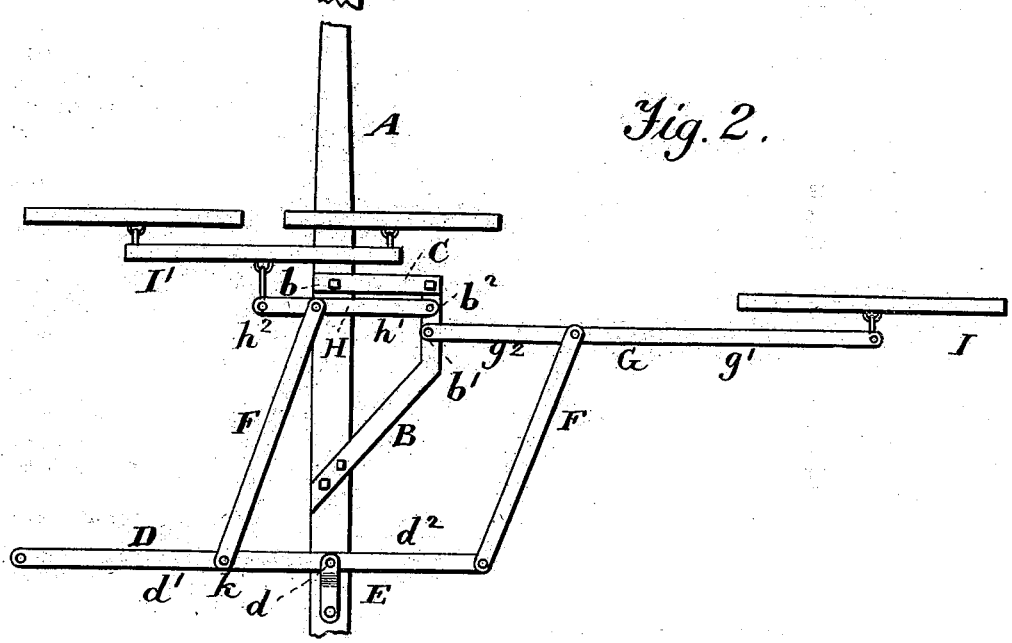

Figure 1 of the drawings is a plan view of my equalizer when adjusted to the use of four horses; Fig. 2 a similar view showing it adapted to the use of three horses.

In the drawings, A represents the pole of a vehicle and B a metallic plate securely fastened on the pole so as to project on the right side thereof. The plate B is bolted at $b\ b$ near each end to the pole, and to it at $b'\ b''$ on opposite sides are pivoted the levers G H.

C is a metallic brace from the pole across the plate and bolted at one end to each.

D is a lever fulcrumed to the pole at $d$ so as to leave the arm $d'$ only one half the length of the arm $d^2$ and having a pair of metallic straps F pivoted to each end, on the upper and under sides, the other ends of these double straps being in like manner fastened by a pivot bolt to the levers G H.

E is an iron strap on the tongue or pole A, made fast at its rear end thereto and receiving the bolt through its front end, so as to help the bolt to bear the draft strain.

The lever G is pivoted at its left end to the plate B, has the double tree I pivoted to its other end and is pivoted to the strap F at $g$, the right arm $g'$ being twice the length of the left arm $g^2$.

The lever H is end pivoted to the plate B at $b^2$ so as to allow the strap F to be pivoted thereto and make the right arm $h'$ twice as long as the left arm $h^2$, the double tree I' being pivoted to the end of the said lever.

As shown in Fig. 2 of the drawings one horse must pull against two which he can do without any inconvenience by simply pivoting the left hand strap F at K—which is two thirds the distance from the left end of lever D to the fulcrum $d$.

What I claim as new, and desire to protect by Letters Patent, is—

The herein described draft equalizer consisting of a lever D pivoted to the pole and connected by an adjustable rod or strap F to a lever H one end of which carries the doubletree and the other attached to a bracket extending from the opposite side of the pole, and a lever G pivoted to said bracket and connected by a rod or strap to the rear lever and carrying a doubletree and single trees substantially as shown and for the purpose set forth.

In testimony whereof I affix my signature in presence of two witnesses.

WILLIAM F. KEHM.

Witnesses:
CHARLES HARDING,
DUNCAN RULE.